United States Patent
Beaujard et al.

(10) Patent No.: US 9,469,417 B2
(45) Date of Patent: Oct. 18, 2016

(54) SYSTEM AND METHOD FOR FAULT DIAGNOSIS OF AIRCRAFT

(71) Applicant: FLIGHTWATCHING, Toulouse (FR)

(72) Inventors: Jean-Philippe Beaujard, Plaisance du Touch (FR); Olivier Ho Dac, Toulouse (FR)

(73) Assignee: FLIGHTWATCHING, Toulouse (FR)

( * ) Notice: Subject to any disclaimer, the term of this patent is extended or adjusted under 35 U.S.C. 154(b) by 0 days.

(21) Appl. No.: 14/536,697

(22) Filed: Nov. 10, 2014

(65) Prior Publication Data
US 2015/0134194 A1   May 14, 2015

(30) Foreign Application Priority Data
Nov. 13, 2013  (FR) .................................... 13 61073

(51) Int. Cl.
| | |
|---|---|
| B64F 5/00 | (2006.01) |
| G07C 5/08 | (2006.01) |
| G06Q 10/06 | (2012.01) |
| G06Q 10/00 | (2012.01) |
| G06Q 50/30 | (2012.01) |

(52) U.S. Cl.
CPC ......... B64F 5/0045 (2013.01); G06Q 10/0631 (2013.01); G06Q 10/20 (2013.01); G06Q 50/30 (2013.01); G07C 5/0808 (2013.01)

(58) Field of Classification Search
CPC ... B64F 5/0045; G07C 5/0808; G06Q 50/30; G06Q 10/20; G06Q 10/0631
USPC .............................................. 701/31.7, 33.2
See application file for complete search history.

(56) References Cited

U.S. PATENT DOCUMENTS

| | | | | |
|---|---|---|---|---|
| 7,209,813 | B2* | 4/2007 | Namaky ............... | H04L 67/125 701/33.2 |
| 7,643,916 | B2* | 1/2010 | Underdal .............. | G06N 5/022 701/31.4 |
| 8,190,727 | B2* | 5/2012 | Henkel .................. | G06F 15/16 709/208 |
| 8,239,094 | B2* | 8/2012 | Underdal ........... | G06Q 10/0631 701/29.4 |
| 8,929,198 | B2* | 1/2015 | Yousefi .................. | H04N 7/183 370/216 |
| 8,942,882 | B2* | 1/2015 | Swearingen ......... | G08G 5/0021 244/17.13 |
| 8,958,975 | B2* | 2/2015 | Savaresi ............... | B60W 40/09 701/1 |
| 9,043,073 | B2* | 5/2015 | Ricci ...................... | G06F 17/00 340/438 |

(Continued)

FOREIGN PATENT DOCUMENTS

| | | |
|---|---|---|
| CA | 2815442 A1 | 11/2013 |
| EP | 1736894 A1 | 12/2006 |

(Continued)

*Primary Examiner* — Atul Trivedi
(74) *Attorney, Agent, or Firm* — IM IP Law PLLC; C. Andrew Im

(57) ABSTRACT

An aircraft failure diagnostic method and system includes a group of at least one smart mobile device, mobile in relation to the on-board equipment of an aircraft. The smart mobile device transmits a request for measurement data to an on-board equipment, following a tree structure of measurement data to be acquired. A piece of measurement data received from the on-board equipment by a smart mobile device causes passage to a later step in the tree structure of measurement data requests or interactive maintenance document. The interactive maintenance document is generated by automatically extracting inferences, data to be measured, measurements achievable on the on-board equipment, and measurements requiring a tool not included in the on-board equipment from an aircraft technical documentation.

18 Claims, 7 Drawing Sheets

(56) References Cited

U.S. PATENT DOCUMENTS

| | | | |
|---|---|---|---|
| 9,092,914 B2* | 7/2015 | Muetzel | G07C 5/00 |
| 9,123,189 B2* | 9/2015 | Kollgaard | G06Q 50/00 |
| 9,165,414 B2* | 10/2015 | Karnik | G07C 5/0816 |
| 2004/0106404 A1* | 6/2004 | Gould | B64D 47/00 455/431 |
| 2006/0089846 A1 | 4/2006 | Middlebrook | |
| 2006/0120181 A1* | 6/2006 | Berbaum | G06F 11/273 365/191 |
| 2007/0114280 A1 | 5/2007 | Coop et al. | |
| 2009/0051502 A1* | 2/2009 | Craik | G06Q 10/06 340/10.51 |
| 2009/0234517 A1* | 9/2009 | Feuillebois | G06Q 50/28 701/3 |
| 2010/0042283 A1* | 2/2010 | Kell | G06Q 10/0875 701/29.3 |
| 2010/0185362 A1* | 7/2010 | Vialatte | G07C 5/085 701/33.4 |
| 2010/0318396 A1 | 12/2010 | Geddam et al. | |
| 2012/0090035 A1* | 4/2012 | Mehta | G06Q 10/08 726/26 |
| 2012/0197486 A1* | 8/2012 | Elliott | G07C 5/008 701/33.2 |
| 2012/0221191 A1* | 8/2012 | Bell | G06Q 10/00 701/29.1 |
| 2012/0259484 A1* | 10/2012 | Shields | B64D 25/00 701/3 |
| 2013/0261876 A1* | 10/2013 | Froom | B64F 5/0045 701/29.3 |
| 2013/0332022 A1* | 12/2013 | Green | B64F 5/0045 701/29.1 |
| 2014/0114527 A1* | 4/2014 | Goodrich | G07C 5/085 701/31.4 |
| 2014/0195100 A1* | 7/2014 | Lundsgaard | G07C 5/0841 701/29.6 |
| 2015/0210287 A1* | 7/2015 | Penilla | B60W 40/08 701/49 |
| 2016/0031570 A1* | 2/2016 | Ordy | G10L 15/1822 705/7.42 |

FOREIGN PATENT DOCUMENTS

| | | |
|---|---|---|
| EP | 2166455 A1 | 3/2010 |
| JP | 2003002298 A * | 1/2003 |

* cited by examiner

SYSTEM AND METHOD FOR FAULT DIAGNOSIS OF AIRCRAFT

RELATED APPLICATIONS

This application claims priority from French Patent Application No. 13 61073 filed Nov. 13, 2013, which is herein incorporated by reference in its entirety.

TECHNICAL FIELD OF THE INVENTION

The present invention relates to the domain of on-aircraft diagnostic systems and methods.

It more particularly concerns a system that includes software and smart mobile devices capable of interrogating aircraft equipment and of reading measurements provided by maintenance tooling.

PREAMBLE AND PRIOR ART

The content of maintenance documentation for aircraft, notably airplanes, has become extremely complex. It contains diverse information that distances the user from the task in hand: safety warnings, precautions with regard to labor legislation, steps for setting the aircraft configuration, multiple measurements, operational test steps, task closing actions.

Almost half of the users of airline companies consider that the way in which the information is presented does not correspond to the way of performing a maintenance task [CHAPPARO et al. 2002]. The user is often lost in the complexity of the documentation, in spite of attempts at standardized presentation, and has problems in finding the essential tasks.

Errors of interpretation can cause significant technical delays resulting in high financial costs for airline companies. Maintenance documents have their share of responsibility when operators cannot find the information they need therein, if they cannot understand the information provided or if they prefer deliberately to deviate from it.

According to CHAPARRO et al. (2002), 62% of maintenance technicians do not systematically follow the procedures of the maintenance documentation in spite of the legal obligation. The principle reason invoked being that their own methods are better suited to reality in the field.

According to usual procedures, the starting point in a search for a failure is generally an anomaly code or text that appears in the maintenance reports at the end of an aircraft flight, or that can be transmitted during the flight by the crew or by automatic data transmission means.

The aircraft maintenance documentation supplied by the manufacturer then enables the technicians to identify the corrective maintenance task associated with the code or text.

A highly complex tree structure of the maintenance documentation appears, together with the need to perform a large number of steps one after the other in order to identify the origin of the failure.

Furthermore, electronic documentation solutions exist nowadays that simplify documentary navigation thanks notably to hyperlinks. But this proves to be insufficient, as the operator loses the thread of the search in passing from one document to another. The diagnostic and hence the aircraft maintenance time taken by the technicians therefore becomes considerably longer. This results in periods of aircraft grounding and thus causes significant operating losses.

The system and method described in the present invention allow at least some of these problems to be resolved in the search for failures on aircraft.

OBJECT AND SUMMARY OF THE INVENTION

To that effect, the invention focuses in the first instance on a method for exchanging data between a first group of at least one item of on-board equipment of an aircraft, said on-board equipment being capable of supplying functioning measurements of at least one aircraft system, and a second group of at least one smart mobile device, mobile in relation to the aircraft items of equipment, said method being intended to be implemented as part of an operation of remote maintenance of the aircraft, the latter being in flight.

The on-board items of equipment and smart mobile devices communicate with each other, the method including at least one request for measurement data from at least one smart mobile device to at least one item of on-board equipment, following a tree structure of measurement data to be acquired by at least one of the smart mobile devices or supplementary tooling from a set of on-board equipment, said on-board equipment transmitting in response the data required by the smart mobile device, an item of data received by a smart mobile device causing the passage to a later step in a tree structure of measurement data requests.

By smart mobile device, one means an autonomous device such as a smartphone, PC tablet, Google glass—registered trade name—or other device known in English under the generic name "smart device". According to Wikipedia—registered trade name—a "smart device" is defined as an electronic device, usually connected to other devices or networks via different protocols such as Bluetooth, NFC, WiFi, 3G etc., that can operate, to some extent, interactively and autonomously.

The smart mobile device in question here is not part of the aircraft equipment. It is therefore not certified according to the standards applicable to aircraft on-board equipment. The smart mobile device does not belong to the cockpit. This represents a financial advantage, since the cost of the smart mobile device is therefore low compared with certified equipment. Another advantage is the ability for maintenance operatives to use this smart mobile device on the ground while the aircraft is in flight.

The tree structure of measurement data requests is generated beforehand on the basis of the aircraft technical documentation by adapting the procedures included in this aircraft technical document to the case of an aircraft in flight, by automatically extracting from this aircraft technical document the inferences, the data to be measured, the remote measurements and the remote actions achievable on the aircraft equipment, and those requiring tooling not included in the on-board equipment.

The method detects the steps to be performed and classifies them as measurements or actions.

Some measurements planned for on the ground can be taken in flight but must be adapted to the flight context (airplane operating condition, pressure, temperature etc.). Others can be deduced from the environment of the system under investigation. Other measurements cannot be taken remotely or require tooling and access to the airplane. Integration with the maintenance logistic tools on the ground allows the necessary tool kit to be constituted. The actions can be adapted to the flight context. If the action cannot be commanded on the ground, the method can nevertheless decide to observe the aircraft to validate correct operation (The documentation can mention a movement test of a mobile surface, the method can decide to wait until the aircraft makes it by itself over certain phases of flight in cases where the mobile surface cannot be actuated on the ground). We will therefore talk about documentary adaptation rather than documentary transformation.

The interactive maintenance document includes a set of branches, each branch including at least one step of acquiring a measurement, whose result must be validated positively or negatively in order to progress to a next step and reach a diagnosis.

In a particular implementation, the method includes, for at least one requested piece of measurement data, a verification step that the piece of measurement data conforms to a predetermined value range, a messaging step on at least one smart mobile device or one external monitoring terminal of the result of this verification.

More particularly, in this case, the method advantageously includes a step, by an operator of one of the smart mobile devices or of an external monitoring terminal, for validating the conformance or non-conformance of the piece of measurement data, and for drafting a conformance report.

The method advantageously includes a step for passing to a branch of the tree structure of measurement data to be obtained, taking account of the conformance or non-conformance of the piece of measurement data.

In a particular implementation, the method includes a step for taking into account measurement data obtained prior to the ongoing maintenance operation, notably data obtained by the on-board equipment during at least one flight phase.

In this case, according to an even more particular implementation, the method includes a step for recording the date of each piece of measurement data gathered from the on-board equipment or smart mobile devices or other measuring tooling used, and a validation of the piece of data only if it is sufficiently recent, a temporal proximity value having been determined beforehand.

In a particular implementation, for at least one set of smart mobile devices or external monitoring terminals dedicated to the ongoing maintenance operation, the measurement results from all the equipment are displayed simultaneously on these smart mobile devices or external monitoring terminals as they are received.

In this case, in an even more particular implementation, the method includes a step for the automatic generation of a report including all the measurement steps covered, the data gathered, the validation or non-validation decisions for these measurements, the dates of these decisions and the identity of the smart mobile device or external monitoring terminal at the origin of the decision.

In a particular implementation, the smart mobile device transmits a request for measurement data to at least one item of on-board equipment according to a proximity criterion of said fixed equipment or a criterion of the absence of data received from this on-board equipment by any one of the smart mobile devices since a predetermined time.

In a particular embodiment, a piece of data received by a smart mobile device is not re-requested by the other smart mobile devices.

In a particular implementation, the method is implemented at least partially when the aircraft is flying. In fact, it is extremely useful to be able rapidly to analyze a failure occurring in flight, and to process in real time what it might be in order to avoid having to land the aircraft, which engenders significant extra costs.

One understands that, in this situation, it is not possible to test all of the aircraft systems from a maintenance center located on the ground, but only some of them, equipped to be remotely interrogated. It is thus necessary to perform at least part of the maintenance remotely, based on the only information available.

In this implementation, use of the aircraft maintenance documents must be interpreted according to the available data.

The method thus includes a step for adapting the procedures described in detail in the maintenance documentation to the context of an aircraft in flight, hence exposed to different environmental conditions from those of a maintenance hangar on the ground. It is notably a question of removing the measurement phases that are not applicable to the case of an aircraft in flight from these maintenance procedures, and of adapting the measurements according to local conditions. A task of interpreting the maintenance documentation therefore exists for potential use in flight.

The invention also focuses on a computer program product (in other words, software), including instructions suitable for implementing the method described above.

In another aspect, the invention focuses on a diagnostic system for aircraft failures, including at least one smart mobile device and implementing a method such as that described.

BRIEF DESCRIPTION OF THE DRAWINGS

The characteristics and advantages of the invention will be better appreciated thanks to the description that follows, which description presents the characteristics of the invention through a non-limiting embodiment example.

The description is based on the attached figures representing.

DETAILED DESCRIPTION OF AN EMBODIMENT OF THE INVENTION

Figure 1:
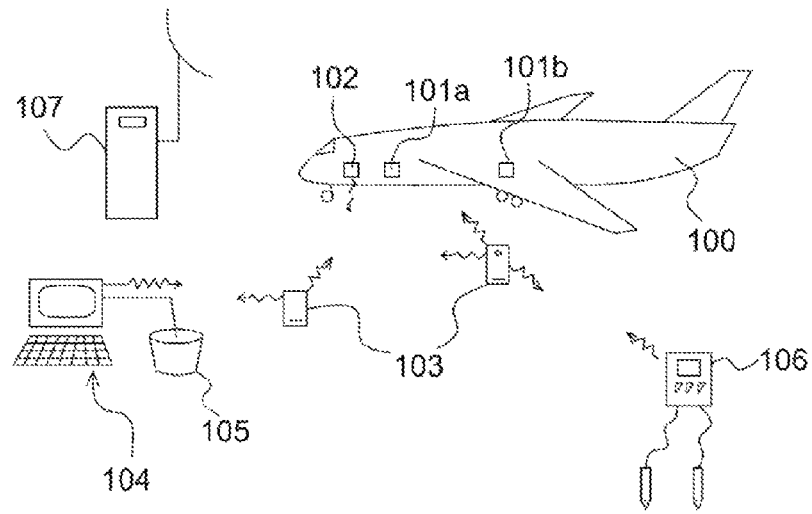
FIG. 1: a schematic diagram of the elements making up the embodiment of the invention.

As shown in FIG. 1, the invention resides within the framework of the maintenance of equipment such as an aircraft 100, typically of, but not limited to, the commercial transport airplane type. This aircraft 100 is assumed to be provided with a set of on-board measuring equipment 101a, 101b etc., capable of acquiring data relative to the functioning of a set of aircraft systems such as cockpit equipment, engines, generators etc. These on-board items of measuring equipment 101a, 101b etc. are linked with a communication network 102, also carried on board the aircraft 100, and which enables the measurements to be transmitted to the ground and the equipment to be interrogated remotely. The data are assumed to be received by a server 107 on the ground, which will be able to retransmit them to a central server 104 implementing the method associated with the diagnostic system.

The diagnostic system that is the subject of the present invention includes in the first instance at least the smart mobile device 103. Each smart mobile device 103 here is of the PC tablet type, that is to say, a lightweight portable device including calculation and storage means, a display screen, preferably, but not necessarily, touch-sensitive, means of remote communication with other smart mobile devices 103 or a central server 104. In an embodiment variant, these smart mobile devices 103 are portable computers, smartphones with large screens etc.

The central server 104 is capable of interrogating the on-board items of equipment 101a, 101b of the aircraft 100, as well as the databases of the airline companies owning said aircraft in order to supply to the users (maintenance technicians) sufficient information for diagnosing a failure. This central server 104 is interfaced through GSM or WiFi with the smart mobile devices 103 and through the Internet or intranet with workstations (not illustrated in FIG. 1). It should be noted that the system can operate several central servers 104 communicating with each other.

The central server 104 is, for example, of the microcomputer type provided with display means, data input means, means of communicating with the smart mobile devices 103 and data storage means 105.

The diagnostic system also operates, in the present, non-limiting example, maintenance tools or tooling 106, which have the particular feature of communicating their measurements to the smart mobile devices 103 via wired or wireless communication means. Such tooling 106 includes, for example, a multimeter communicating the electrical measurements obtained via a wireless network, for example of the Bluetooth type. Such maintenance tooling is known per se and, as such, is outside the framework of the invention.

The diagnostic system that is the subject of the present invention also includes, in the present embodiment example, at least one external monitoring terminal 108. Each external monitoring terminal 108 here is of the PC type, including calculation and storage means, a display screen, means of communicating remotely with the smart mobile devices 103 and the central server 104. In the implementation of the method, these external monitoring terminals 108 are intended to be operated, for example, by engineers or experts from outside, not directly in charge of the maintenance operation, but whose skills can be useful in resolving the problem.

Figure 5A:
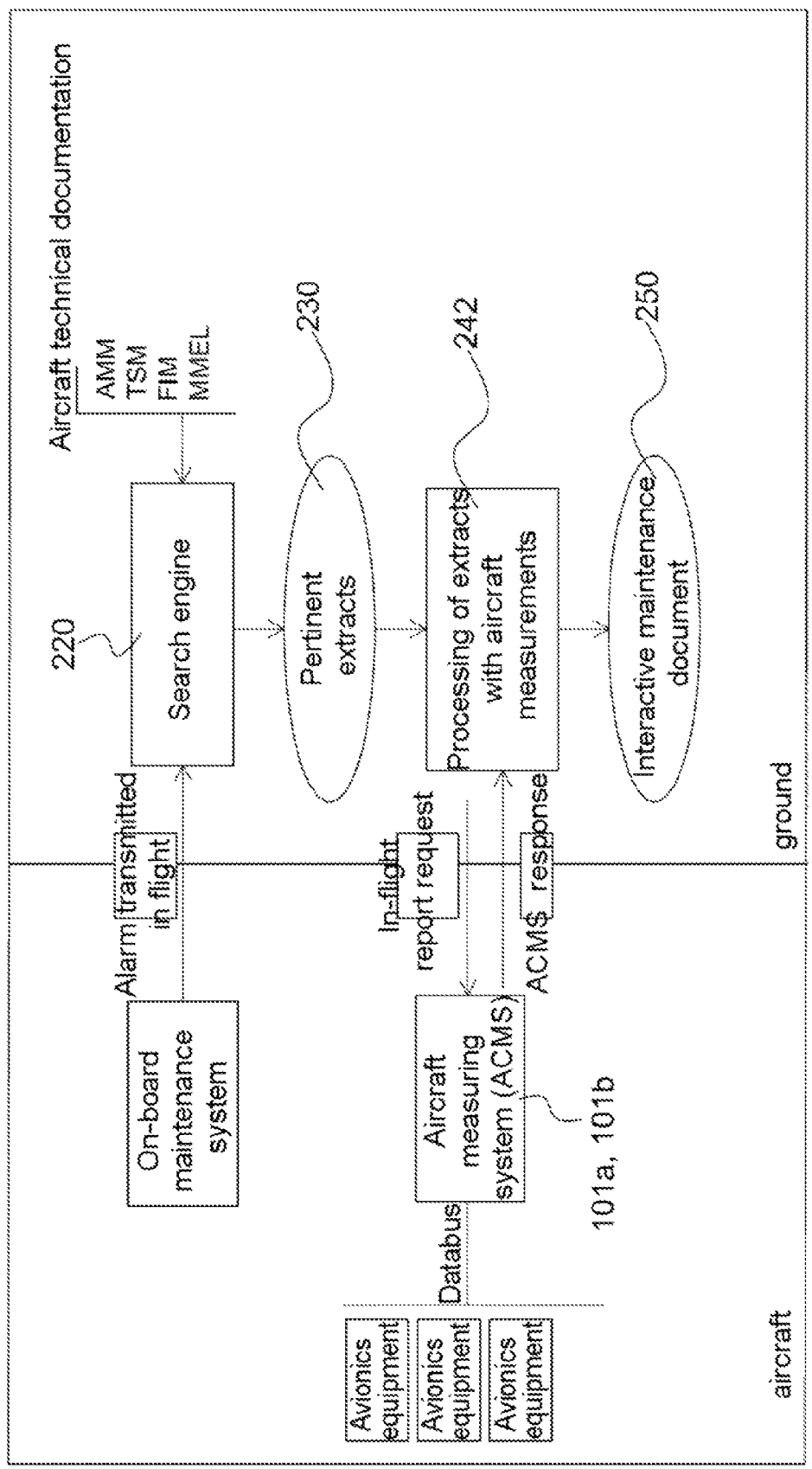
FIGS. 5a, 5b, 5c: a summary of the steps (central servers part) for implementing the aircraft maintenance method using the interactive maintenance document and the alternatives.
Figure 5B:
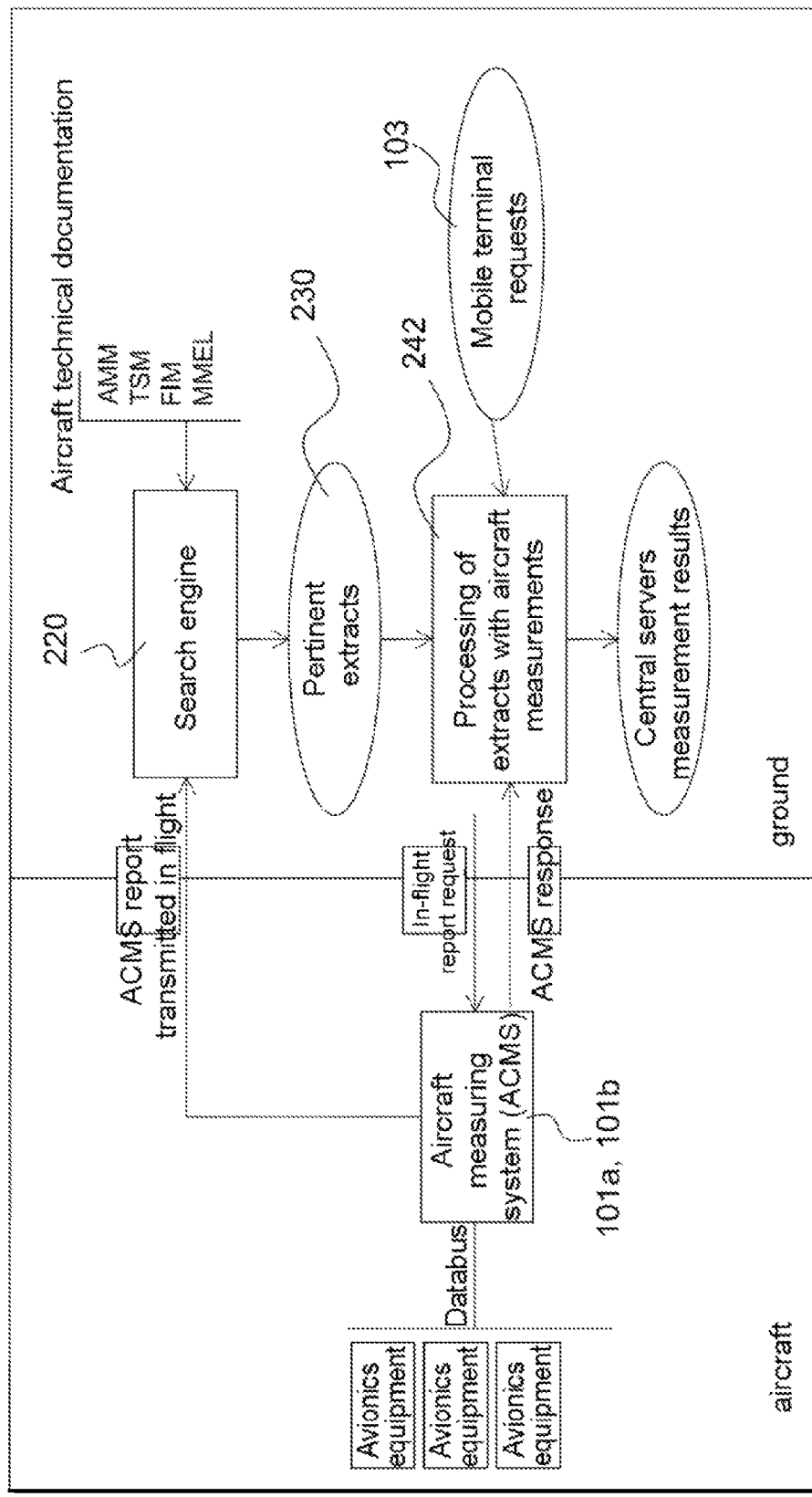
Figure 5C:
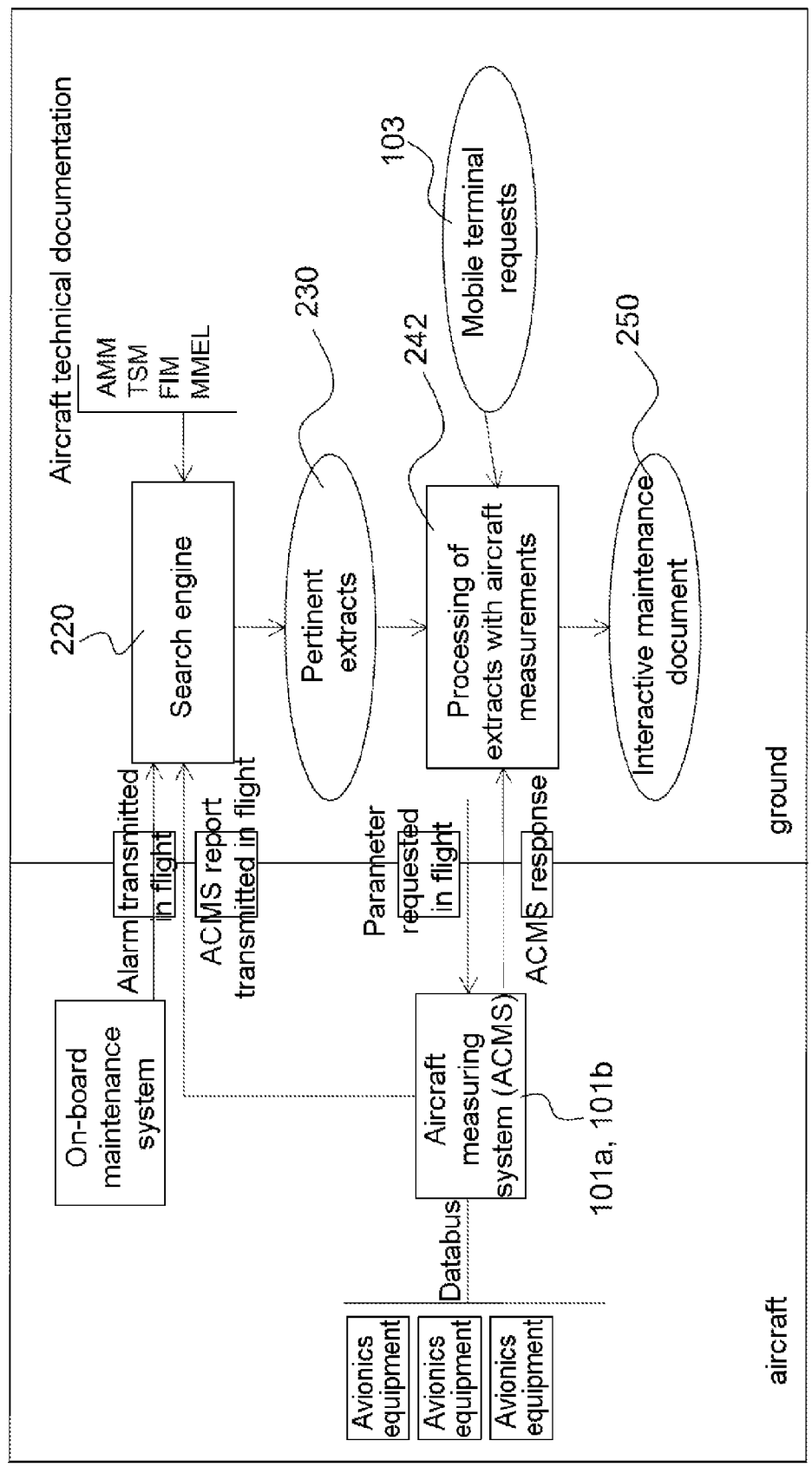
Figure 6:
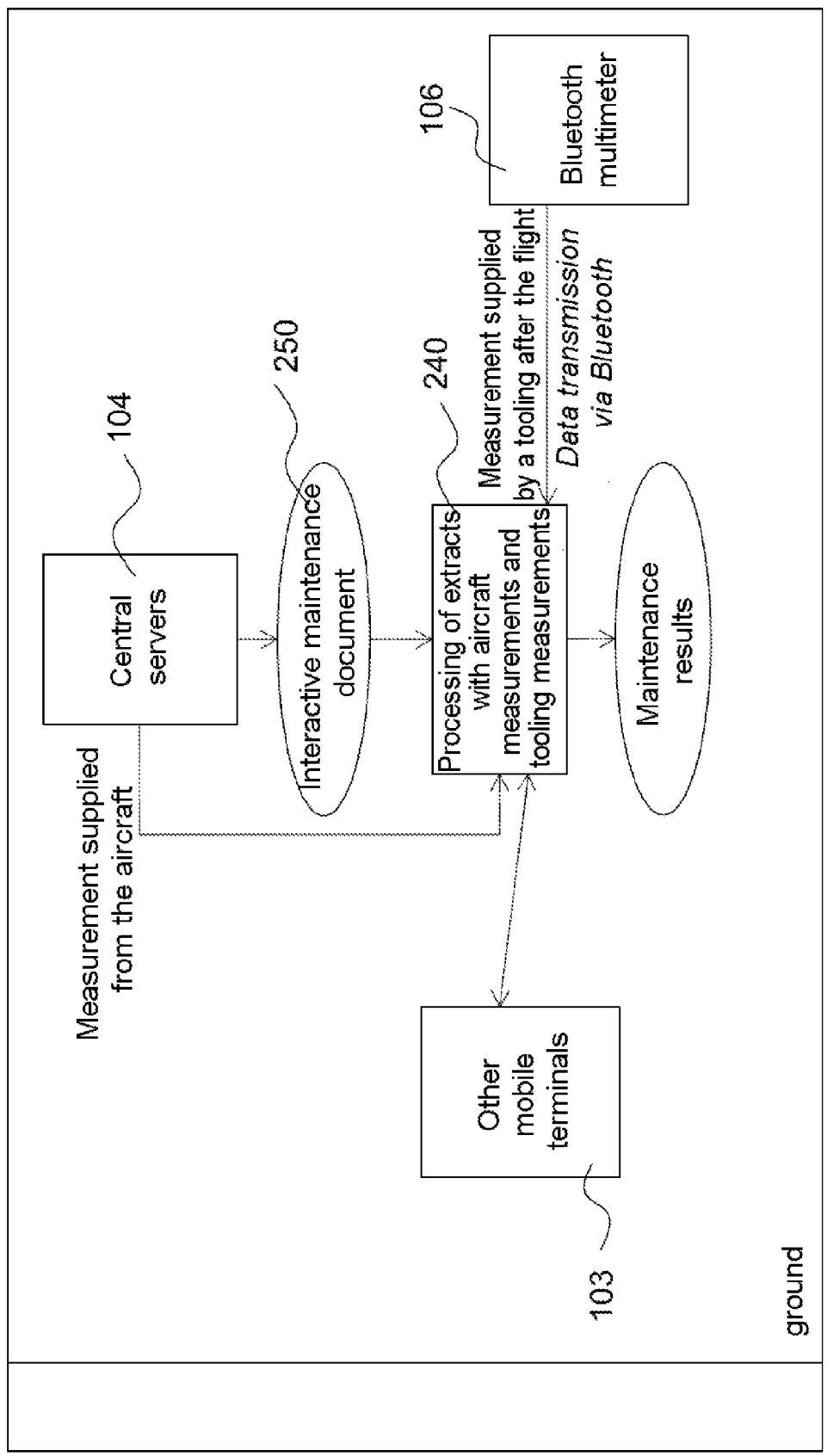
FIG. 6: a summary of the steps (smart mobile devices part) for implementing the aircraft maintenance method using the interactive maintenance document and the alternatives.

The maintenance method (see FIG. 5a-5c) as described here as an example is implemented in the form of software installed, for at least one part, on the smart mobile devices 103 or external monitoring terminals 108, and for at least another part, on the central server 104.

The method comprises two principal phases. In a first phase 200 (see FIGS. 3 and 5a-5c), maintenance documentation called "aircraft technical documentation" 210 of an aircraft 100 of a type chosen beforehand is segregated into a set of automatic and remote measurements and into a set of questions and answers forming an interactive maintenance document 250. Such aircraft technical documentation 210 is usually presented in the form of a list of aircraft systems, the equipment of each system, the description of said equipment and possible failures of said equipment. The automatic measurements are adapted to the context of the airplane (ground, taxiing, takeoff, cruise, approach etc.).

Figure 2:
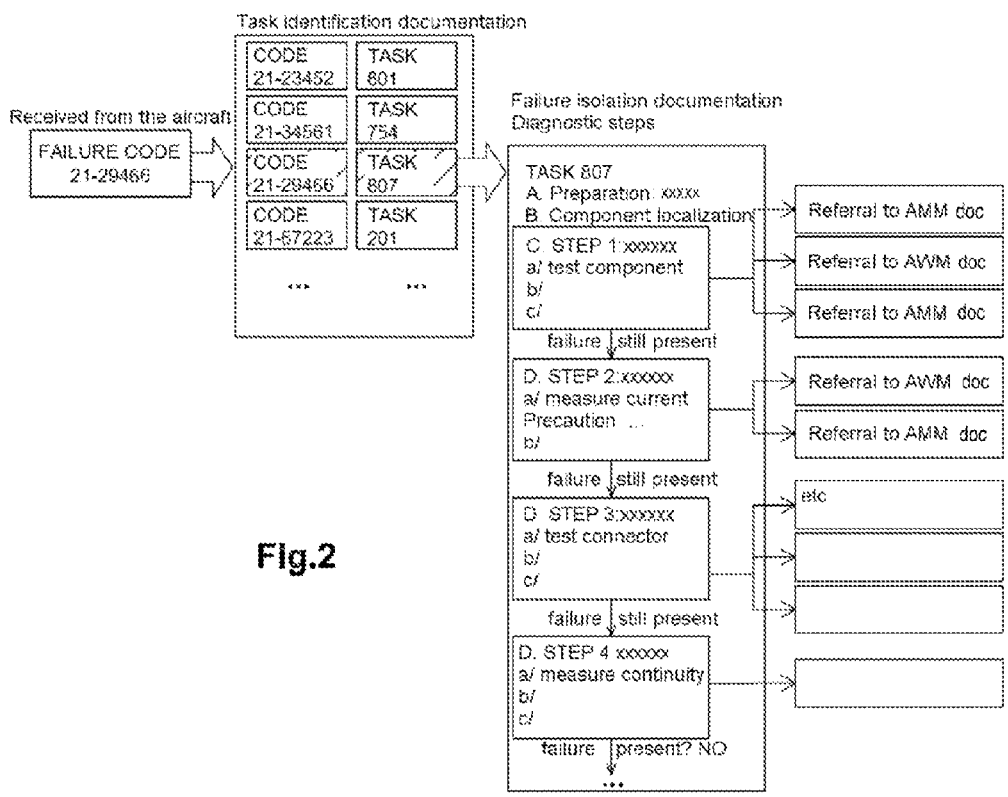
FIG. 2: an example of an aircraft technical documentation structure.

The aircraft technical documentation 210 allows the technician to identify the corrective maintenance task associated with the code. Each task identifies a list of actions to undertake, one after the other, in order to isolate the component to be replaced/repaired. The diagnostic steps are broken down into multiple different chapters of the manual, through which the reader must "navigate", and it is not unusual for the technician to lose the notion of what he is looking for. FIG. 2 illustrates the structure of the aircraft technical documentation 210 in the particular case of a sub-equipment failure, and reveals the complexity of the structure of this documentation and the need to perform the steps one after the other in order to identify the cause of the failure.

As shown in this figure, when a failure code is received from an aircraft of a given type, task identification documentation provides the task to be accomplished for each failure code, this task including a succession of measurement steps to perform in order to identify the incriminated component. This list of measurements to obtain is supplied in failure isolation documentation, which provides, for example for a given failure, localization of the component in question, the precautions to be envisaged, then successive steps, for example, first, a component test task, secondly a current measuring task, thirdly, a connector test task etc. Each of these tasks possibly includes special precautions. Each of the steps or precautions refers back to instructions, described in one of the documents listing all of the maintenance actions.

On another hand, the interactive maintenance document 250 is intended to be available in the form of a logic tree structure of measurements taken, suitable precautions, standard limit values etc.

The questions in the interactive maintenance document 250 are those usually asked by aviation maintenance technicians in order to establish the diagnosis of a given failure. In a non-limiting example of a diagnostic path: Which assembly drawing will be useful to me? Which components might have failed? How to identify the cause of the failure? How to dismantle the component? Which tools are needed for dismantling? How to test the component? etc.

The aircraft technical documentation 210 is digitized, then analyzed by a search engine 220. What we call a search engine here is software performing a series of searches for keywords or logic combinations of keywords in the aircraft technical documentation 210.

The search engine 220 applies techniques of syntactic and semantic analysis to the texts of the aircraft technical documentation 210, which are characterized by an intensive use of automatic NLP (natural language processing) tools, including, for example, but not limited to, syntactic analysis, semantic disambiguation, the search for anaphora referents, the detection of metaphors, taking account of converse, named entity recognition, conceptual and thematic analysis.

In a first instance, all of the steps that can be made automatically and remotely on the aircraft, whether the aircraft is in flight or on the ground, are isolated and withdrawn. They are withdrawn from the interactive maintenance document 250 and appear as measurements or actions already performed automatically.

The tooling and equipment required for the maintenance task are then identified in the document. The aim is to analyze tooling and equipment that are not standard (that is to say, not included in the mechanic's toolkit). These tools and equipment are highlighted in the interactive maintenance document 250, for example with a dedicated color. This part number is always repeated with the same color in the various tasks of the interactive maintenance document 250 calling up this tooling and equipment. An image in the interactive maintenance document 250 can be associated with each tooling or equipment in order to make recognition of the tools/equipment to be used easier for the operator.

Then, in a particular implementation, all of the diagrams involved in the performance of the maintenance task are analyzed. There are part numbers on these diagrams: either of small components such as, for example, bolts and screws with numbers, or of parts with part numbers. The aim is to identify where these part numbers arise and the use made of these components in each phase of the maintenance task. If measurements or actions have been performed during a flight phase, the diagram is changed to show clearly the difference in context (landing gear retracted, engines operating, altitude etc.).

In this way, when the maintenance task is presented in the form of a checklist with a succession of steps: in each step, the figure is copied if one of these components is used. Therefore, when an operator (technician) reads the step, the checklist repeats the figure just below. There is no need to look for the figure right at the bottom of the text as is usually seen in a maintenance task where the figure is only shown once. The aim is to repeat the figure as many times as necessary so that, when an operator performs a step of the checklist, he will have the associated figure.

The maintenance document is then analyzed to identify the items that are linked to the safety of the operator on the ground (the mechanic). This analysis can be done via NPL techniques. In this non-limiting example, these items are identified in order to be able to display them in a specific way in the interactive maintenance document 250: more specifically, in the form of a single message of the "pop-up" type, grouping all of the items linked with safety for this task. The user is therefore obliged to read the safety "pop-up" and will accept these conditions by clicking on a button, for example, of the type "I AGREE".

In the same way, the elements of the interactive maintenance document 250 linked with risks of damage on the airplane are analyzed in order to be presented in the form of a single message of the "pop-up" type, to be accepted and read by the maintenance operator. This analysis can be done via NPL techniques.

The optional steps are also identified in the maintenance document such that they can appear in a differentiated manner in the interactive maintenance document 250.

The maintenance document is analyzed in order to break the whole of the maintenance task described in the document down into a set of steps of the interactive maintenance document 250. Each step corresponds to a physical step to be performed.

The maintenance steps are analyzed in order to give them a title that appears in a checklist. This title does not correspond to the maintenance action to perform, but the action performed once completed. For example, the installation of a tooling of the JACK type corresponds to a step, but the summary of the step will be "JACK INSTALLED". These analysis steps can be performed via NPL techniques.

Finally, for each step, actions that might be the object of a measurement are analyzed.

This analysis performed by the search engine 220 identifies various types of elements useful to the maintenance action in order to make them usable in the form of a checklist:
  safety warnings,
  precautions with regard to labor legislation,
  preparatory tasks,
  execution tasks,
  tasks that might be the object of a remote measurement,
  diagrams,
  animations,
  inspection steps
  etc.

Elements likely to allow a diagnosis of an aircraft failure are thus extracted from the aircraft technical documentation 210, and are named in the further description pertinent extracts 230. Typically, the summaries and other generic parts of the aircraft technical documentation are considered not pertinent to the generation of a tree structure list of measurements or tests to perform that form the interactive maintenance document 250 that is to be generated.

The pertinent elements 230 extracted by the search engine take the form, for example, of part numbers of non-standard tooling necessary to the performance of the task, sentences or extracts from sentences requiring a component to be dismantled, sentences or extracts from sentences on cleaning. Integration with a ground information system allows this tooling to be localized/identified so that the mechanic can make up his toolkit.

They form an ordered list of steps to be followed by the operator.

Figure 3:
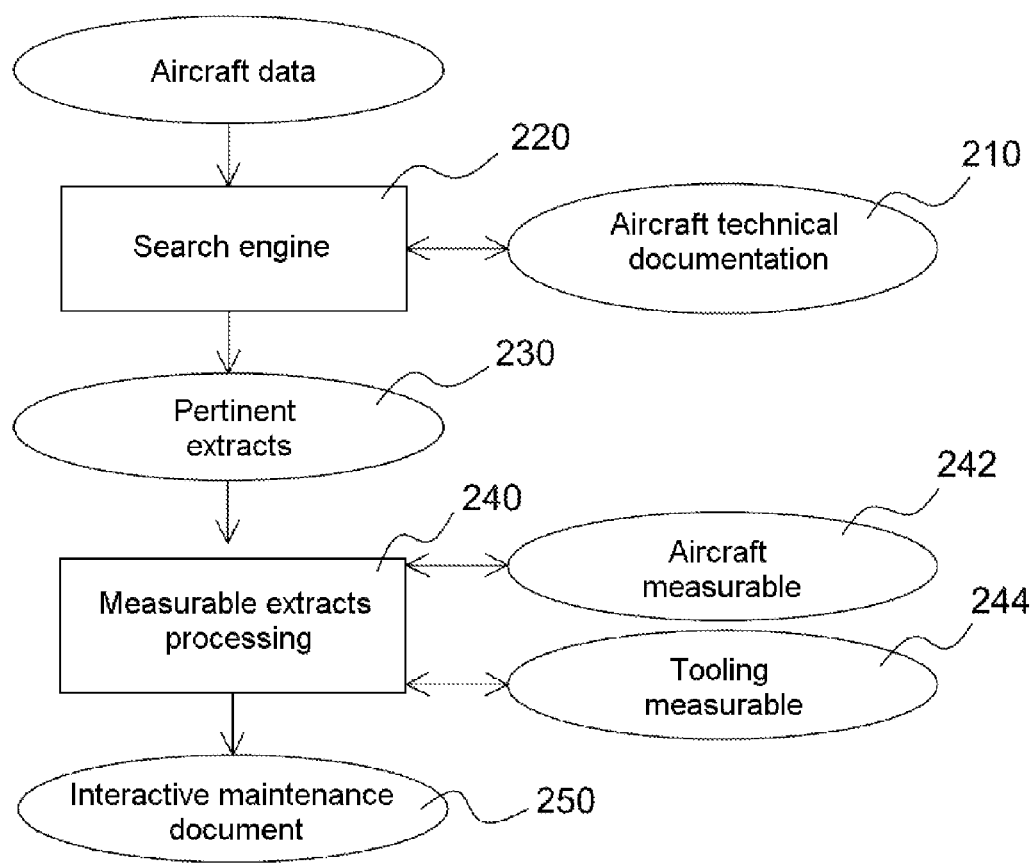
FIG. 3: a summary of the steps of the method of transforming aircraft maintenance documentation into an interactive document for a PC tablet.

The next step consists of analyzing the pertinent extracts 230 in order to extract from them the elements that might be the object of a measurement (marked "Measurable extracts processing" 240 on FIG. 3). It is a question of identifying the measurable elements by means of unconnected maintenance tooling or connected tooling of type 106, these elements being called "tooling measurables" 244, but also measurable elements called "aircraft measurables" 242, via the on-board items of measuring equipment 101*a*, 101*b*, which can be transmitted directly to the ground via the communication interface 102, notably during a flight.

It is then a question of identifying, via a documentary search, the starting conditions (flight history), if there are measurements to take, and of identifying the expected values according to the manufacturer's documentation (including the aircraft technical documentation 210). The elements to determine thus include notably:
  the measurements to obtain in order to validate these failure cases,
  the on-board equipment concerned by the measurements to obtain in order to discriminate among these failure cases,
  the network addresses of these items of on-board equipment for remote interrogation, etc.,
  adaptation of the procedures to the context of an aircraft in flight.

The adaptation of the procedures is performed by applying the following methodology:

Each measurable extract 240 is sorted by category. In fact, the maintenance steps that are the object of a measurement can be of different categories. The list of categories is described below (not limiting):

Electronic check of a sensor, stable state test of a component, motion transition tests of a component, direct measurement of a value, leak check, test of an electronic control unit, electrical measurement, configuration test etc.

A procedure dedicated to the analysis in flight is adapted with observable parameters to each category.

A few examples:
Electronic Check of a Sensor
  adapted to "measurements of the observable parameter and checks that the variations in the values received are coherent with the physics of the measurement".
  Example: in-flight measurements of air pressure in a system in order to check that the variations correspond to possible physical behavior of the air in a system.

Stable State Tests
adapted to "measurement of a position or measurement of a state" if the parameter is observable. If not observable, an estimator based on other observable parameters can deduce the position or state.

Certain categories cannot be adapted. In such cases, the measurable extracts relating to them cannot be performed during the flight but only on the ground.

This phase 200 is typically implemented on a computer of the PC type and is integrated in a production tool of the present invention. This phase 200 can be performed prior to the actual aircraft maintenance phase. It can also be performed or partially updated in real time. This is notably the case when changes are made to the airplane technical documentation 210, which is a regular occurrence.

This phase 200 therefore consists of replacing the tens of thousands of pages that constitute the aircraft technical maintenance documentation 210 with a list of measurements to perform, presented in the form of a tree structure of checklists (called interactive maintenance document 250 in the further description).

Example of Adaptation Concerning Airplanes with More than One Hundred Seats.

For example, when a valve in an air pressurization system reveals an anomaly, the aircraft maintenance documentation generally requires three branches of measurement on the ground:

1. a MOVEMENT TEST of the valve on the ground to activate it and check that it is not in a locked position
2. a "leak check" by brushing the valve with an indicator product in order to detect signs when the system is pressurized.
3. a SENSOR check will be verified by measuring the electrical continuity at the sensor terminals, then with its wiring.

In the context of an analysis performed on the ground while the airplane is flying, the data provided are:
the position, open or closed
the air pressure measured by the valve.

The investigation procedures must therefore be adapted on the basis of these two pieces of data:
the MOVEMENT test of the valve will be verified in several steps by checking that different valve positions are measured remotely according to the different flight phases (cruise, landing, parking etc.)
the "LEAK CHECK" will be adapted by comparing the valve pressures on the left-hand side of the airplane with the valve pressures measured on the right-hand side of the airplane (all aircraft have symmetrical architecture between the right- and left-hand sides). A difference confirmed during the flight indicates a leak.
the SENSOR check can only be verified partially in flight: by observing the variations of the pressure values in flight and verifying that these variations correspond to physical behaviors of the air in a system. In fact, sudden variations are a sign of a problem at the sensor or its wiring, since air cannot behave with such a pressure gradient.

Other Adaptations

With regard to the actions (movement tests etc.), it is conceivable that they can be performed remotely (drones). In addition to remote measurements, we wish to talk about remote actions.

It should be noted here that we do not only talk about measurable extracts (240), but about:

measurements
remotely performable
able to be remotely deduced
only possible on the ground
actions
remotely performable (drones)
only possible on the ground
passively observable from the ground Then, in a second phase 300, the interactive maintenance document 250, created during the first phase, is used for the maintenance of an aircraft, for example, between two flights.

Figure 4:
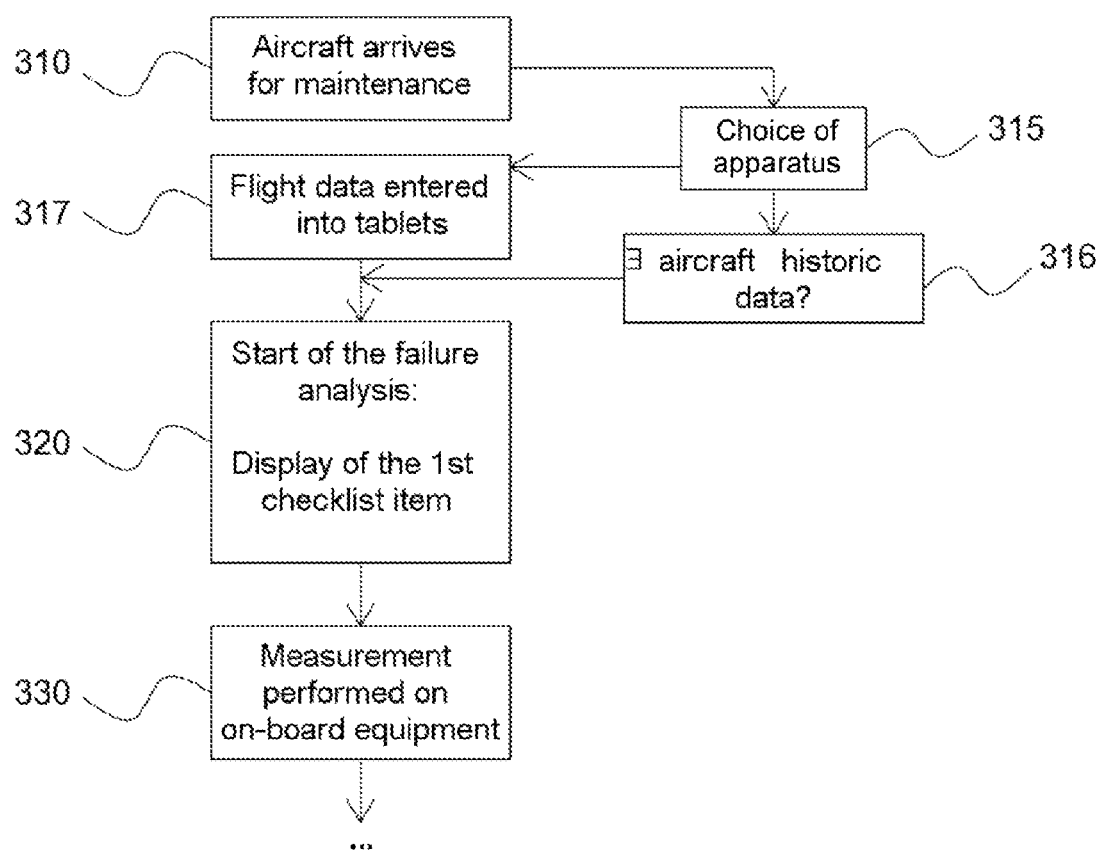
FIG. 4: a flow chart of the steps of the maintenance method using the interactive maintenance document.

FIG. 4 thus illustrates the performance steps of this phase 300.

In a first step 310, an aircraft 100 arrives for maintenance between two flights. It is assumed that this is an aircraft whose maintenance documentation has been processed beforehand by the phase 200 of the method.

In a step 315, the interactive maintenance document for this aircraft type is downloaded into the software of a set of smart mobile maintenance devices 103 assigned to the maintenance of this aircraft 100. This download is performed by the central server 104.

In a step 316, if historical maintenance data exist for this example of this type of aircraft 100, data useful for maintenance are also downloaded into the smart mobile devices 103.

Likewise, in a step 317, if measurements have been transmitted by on-board items of equipment 101a, 101b since the last maintenance, they are also transmitted to the smart mobile maintenance devices 103. In this way, the method allows the taking into account of measurement data obtained prior to the ongoing maintenance operation, notably data obtained by the on-board items of equipment 101a, 101b during at least one flight phase.

Then, in a step 320, a technician near the aircraft 100 starts the actual maintenance diagnostic by opening the interactive maintenance document 250 on his smart mobile device 103. In a particular implementation, the interactive maintenance document 250 is displayed to the operator in the form of a checklist. A first checklist item is thus displayed on the screen of his smart mobile device 103, taking into account the measurements obtained in flight and the history of the aircraft 100.

Example of a checklist:
[Accepted] . . . DANGER: High Hydraulic Pressure
[Accepted] . . . WARNING: Removal of 25 kg equipment
[OK] . . . TIRE PRESSURES CORRECT
[ ] . . . BCM EQUIPMENT removed
[ ] . . . BCM PRESSURE TEST BITE performed In the above example of a checklist, the operator has accepted the safety and labor legislation instructions. The TIRE pressure measurement has been performed and is correct. The last two tasks remain to be performed.

The present invention incorporates collaborative communication functions allowing several technicians, including outside engineers and experts, not present on the aircraft parking site, to contribute to the same maintenance task. These outside engineers and experts follow the progress of the maintenance task on their external monitoring terminals 108, and can intervene to validate or invalidate a received measurement value.

In a step 330, the central server 104, or one of the smart mobile devices 103, interacts with on-board items of equipment 101a, 101b, with measuring tooling 106 operated by maintenance technicians, or with the aircraft 100, in order to obtain the readings and thus to facilitate the diagnostic work of the technician. Technicians can therefore read remote measurements on on-board items of equipment 101a, 101b without intervening directly on the aircraft 100.

A sound signal emitted by a smart mobile device 103 makes it possible to indicate to the technician that the measurement received conforms to what is expected by the interactive maintenance document 250.

Depending on the results of the measurements obtained, the interactive maintenance document 250 guides the technicians to the failure that caused any measurement anomalies, and enables effective maintenance of the aircraft 100.

To that effect, the method includes the following steps for each requested piece of measurement data:
- a step to verify that the piece of measurement data received conforms to a predetermined range of values,
- a messaging step on at least one smart mobile device 103 or one external monitoring terminal 108 of the result of this verification. In the present non-limiting embodiment example, the measurement results from all the items of equipment 101a, 101b, 106 are simultaneously displayed on the smart mobile devices 103 or external monitoring terminals 108, as they are received, for all of the smart mobile devices 103 or external monitoring terminals 108 dedicated to the ongoing maintenance operation,
- a step of validation, by an operator of one of the smart mobile devices 103 or of an external monitoring terminal 108, of the conformance or non-conformance of the piece of measurement data, and of drafting of a conformance report,
- a step for passing to a branch of the tree structure of measurement data to be obtained, taking account of the conformance or non-conformance of the piece of measurement data.

At the end of the maintenance task, the method includes the automatic generation of a report including all the measurement steps covered, the data gathered, the validation or non-validation decisions for these measurements, the dates of these decisions and the identity of the smart mobile device 103 or external monitoring terminal 108 at the origin of the decision.

Advantages

The system and the method described in the present invention allow these problems to be resolved in the search for failures since it replaces the original documentation containing thousands of pages with a series of simplified checklists.

The present invention focuses on failure isolation tasks: those containing all of the measurements to perform in order to identify which component must be replaced or repaired.

The present invention allows useful information to be provided in the form of a very simple and easy-to-use list of actions.

The method uses an implementation on smart mobile device 103 that makes it possible at the same time to have a measuring tool and maintenance steps to be executed according to the manufacturer's instructions.

It is suitable for working near the aircraft 100 and allows a mechanic to read the procedure to apply in order to perform corrective maintenance on the aircraft 100, while analyzing the state of the systems 101a, 101b via remote measurements performed without direct intervention. The remote measuring may have been performed before the start of the mechanic's task, during the preceding flight, for example. In this case, the measurements appear to him to have been adapted, as if he had taken them with the airplane on the ground. For example, if a measurement takes the tire pressures of the airplane during the flight, the pressure shown is not that immediate value, but the value adjusted back to a tire pressure at ground temperature, ground pressure and supporting the weight of the airplane.

The system as described also allows a mechanic to perform pre-flight checks by following the required steps on the smart mobile device 103, some of which give an immediate result by remote measurement from an on-board item of equipment 101a, 101b (tire pressure too low, for example).

The system monitors and records all operations performed in real time. It allows the creation of a report, also in real time. The list of maintenance actions to undertake is generated automatically, together with each maintenance technician's tasks list. The results of the diagnostic and maintenance actions are visible in real time, which makes it possible to monitor the risks of delays linked with maintenance and the time the aircraft will be immobilized on the ground. The system furthermore allows outside experts to be involved in the diagnostic process by providing them in real time with the received measurement data, and by allowing them to enter additional requests for data that can be displayed directly on the operators' smart mobile devices. The system therefore allows connections to be generated among the maintenance technicians, the engineers and the experts around an aircraft maintenance task. It potentially allows a paper intervention report to be replaced with a purely electronic report, supplied directly at the end of the maintenance procedure.

Variants

In a variant implementation, an engineer can, from a workstation in his office, provide support for a difficult failure case by adding supplementary diagrams useful for the failure analysis to the interactive maintenance documentation.

The invention claimed is:

1. A method for exchanging data between a first group of at least one on-board equipment of an aircraft configured to supply functioning measurements of at least one aircraft system, and a second group of at least one smart mobile device in communication with and mobile in relation to said at least one on-board equipment, the method implemented as part of an operation of remote maintenance of the aircraft in flight, comprising the steps of:
   transmitting at least one request for a measurement data from said at least one smart mobile device to said at least one on-board equipment, following a tree structure of the measurement data to be acquired by said at least one smart mobile device or a supplementary tooling from a set of on-board equipment;
   receiving a piece of measurement data in response to said at least one request from said at least one on-board equipment, the piece of measurement data received by said at least one smart mobile device causes a passage to a later step in a tree structure of measurement data requests referred to as an interactive maintenance document;
   generating the interactive maintenance document on a basis of an aircraft technical documentation by:
   adapting procedures included in the aircraft technical document for the aircraft in flight;
   automatically extracting, from the aircraft technical document, inferences, data to be measured, remote measurements and remote actions achievable on said at least one on-board equipment, remote measurements and remote actions requiring a tool not included in said at least one on-board equipment; and wherein the interactive maintenance document comprises a set of branches, each branch comprising at least one step of acquiring a measurement, whose result is validated positively or negatively to progress to a next step and to obtain a diagnosis of a failure based on the measurements;

identifying a component to be replaced or repaired in accordance with the diagnosis of the failure; and replacing or repairing the identified component in the aircraft by a technician.

2. The method as claimed in claim 1, further comprising, for said at least one request for measurement data, the steps of verifying that the piece of measurement data conforms to a predetermined value range; and messaging a result of the verification on at least one smart mobile device or one external monitoring terminal.

3. The method as claimed in claim 2, further comprising the steps of validating conformance or non-conformance of the piece of measurement data by an operator of said at least one smart mobile device or of an external monitoring terminal; and generating a conformance report.

4. The method as claimed in claim 3, further comprising the step of passing to a branch of the tree structure of measurement data to be acquired accounting for the conformance or non-conformance of the piece of measurement data.

5. The method as claimed in claim 1, further comprising the step of accounting for the measurement data acquired by said at least one on-board equipment during at least one flight phase prior to performing an ongoing maintenance operation.

6. The method as claimed in claim 5, further comprising the steps of recording a date of each piece of measurement data acquired from said at least one on-board equipment, said at least one smart mobile device and other measuring tool; and validating said each piece of measurement data only if said each piece of measurement data is acquired recently within a predetermined temporal proximity value.

7. The method as claimed in claim 1, further comprising the step of displaying measurements results from all on-board equipment simultaneously on at least one set of smart mobile devices or external monitoring terminals dedicated to an ongoing maintenance operation.

8. The method as claimed in claim 7, further comprising the step of automatically generating a report comprising all measurement steps covered, the measurement data acquired, validation or non-validation decisions for the measurement data acquired, dates of the validation or non-validation decisions, and an identity of a smart mobile device or an external monitoring terminal associated with each validation or non-validation decision.

9. A non-transitory storage medium comprising executable code to exchange data between a smart mobile device and at least one on-board equipment of an aircraft configured to supply functioning measurements of at least one aircraft system, the smart mobile device is in communication with and mobile in relation to said at least one on-board equipment, the code programs the smart mobile device to be configured to perform the following as part of an operation of remote maintenance of the aircraft in flight:

transmit at least one request for a measurement data to said at least one on-board equipment, following a tree structure of the measurement data to be acquired by the smart mobile device or a supplementary tooling from a set of on-board equipment;

receive a piece of measurement data in response to the request from said at least one on-board equipment, the piece of measurement data causes a passage to a later step in a tree structure of measurement data requests referred to as an interactive maintenance document;

generate the interactive maintenance document on a basis of an aircraft technical documentation by:

adapting procedures included in the aircraft technical document for the aircraft in flight;

automatically extracting, from the aircraft technical document, inferences, data to be measured, remote measurements and remote actions achievable on said at least one on-board equipment, remote measurements and remote actions requiring tooling not included in said at least one on-board equipment; and wherein the interactive maintenance document comprises a set of branches, each branch comprising at least one step of acquiring a measurement, whose result is validated positively or negatively to progress to a next step and to obtain a diagnosis of a failure based on the measurements;

identify a component to be replaced or repaired in accordance with the diagnosis of the failure; and instruct a technician to replace or repair the identified component in the aircraft.

10. A diagnostic system for aircraft failures, comprising at least one smart mobile device to exchange data with at least one on-board equipment of an aircraft configured to supply functioning measurements of at least one aircraft system, said at least one smart mobile device in communication with and mobile in relation to said at least one on-board equipment; wherein said at least one smart mobile device performs the following as part of an operation of remote maintenance of the aircraft in flight:

transmits at least one request for a measurement data to said at least one on-board equipment, following a tree structure of the measurement data to be acquired by said at least one smart mobile device or a supplementary tooling from a set of on-board equipment;

receives a piece of measurement data in response to the request from said at least one on-board equipment, the piece of measurement data causes a passage to a later step in a tree structure of measurement data requests referred to as an interactive maintenance document;

generates the interactive maintenance document on a basis of an aircraft technical documentation by:

adapting procedures included in the aircraft technical document for the aircraft in flight;

automatically extracting, from the aircraft technical document, inferences, data to be measured, remote measurements and remote actions achievable on said at least one on-board equipment, remote measurements and remote actions requiring tooling not included in said at least one on-board equipment;

wherein the interactive maintenance document comprises a set of branches, each branch comprising at least one step of acquiring a measurement, whose result is validated positively or negatively to progress to a next step and to obtain a diagnosis of a failure based on the measurements;

identifies a component to be replaced or repaired in accordance with the diagnosis of the failure; and instructs a technician to replace or repair the identified component in the aircraft.

11. The diagnostic system as claimed in claim 10, wherein, for said at least one request for measurement data, said at least one smart mobile device verifies that the piece of measurement data conforms to a predetermined value range.

12. The diagnostic system as claimed in claim 11, wherein said at least one smart device is configured to generate a conformance report.

13. The diagnostic system as claimed in claim 12, wherein said at least one smart device is configured to pass to a branch of the tree structure of measurement data to be acquired accounting for the conformance or non-conformance of the piece of measurement data.

14. The diagnostic system as claimed in claim 10, wherein said at least one smart device is configured to account for the measurement data acquired by said at least one on-board equipment during at least one flight phase prior to performing an ongoing maintenance operation.

15. The diagnostic system as claimed in claim 14, wherein said at least one smart device is configured to record a date of each piece of measurement data acquired from said at least one on-board equipment and other measuring tool, and configured to validate said each piece of measurement data only if said each piece of measurement data is acquired recently within a predetermined temporal proximity value.

16. The diagnostic system as claimed in claim 10, wherein said at least one smart device is configured to simultaneously display measurements results from all on-board equipment.

17. The diagnostic system as claimed in claim 16, wherein said at least one smart device is configured to automatically generate a report comprising all measurement steps covered, the measurement data acquired, validation or non-validation decisions for the measurement data acquired, and dates of the validation or non-validation decisions.

18. The diagnostic system as claimed in claim 10, wherein said at least one smart device is configured to simultaneously display measurements results from all on-board equipment on external monitoring terminals dedicated to an ongoing maintenance operation.

* * * * *